United States Patent
Le Guludec et al.

(10) Patent No.: US 11,999,622 B2
(45) Date of Patent: Jun. 4, 2024

(54) METHOD AND APPARATUS FOR SEPARATING A SYNTHESIS GAS BY CRYOGENIC DISTILLATION

(71) Applicant: L'Air Liquide, Societe Anonyme pour l'Etude et l'Exploitation des Procedes Georges Claude, Paris (FR)

(72) Inventors: Erwan Le Guludec, Champigny sur Marne (FR); Antoine Hernandez, Champigny sur Marne (FR); Guillaume Teixeira, Champigny sur Marne (FR); Benoit Davidian, Champigny sur Marne (FR); Matthias Linicus, Champigny sur Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 144 days.

(21) Appl. No.: 17/146,116

(22) Filed: Jan. 11, 2021

(65) Prior Publication Data
US 2021/0214218 A1 Jul. 15, 2021

(30) Foreign Application Priority Data

Jan. 14, 2020 (EP) .................................... 20151738

(51) Int. Cl.
*C01B 3/52* (2006.01)
*B01D 53/00* (2006.01)
(Continued)

(52) U.S. Cl.
CPC .............. *C01B 3/52* (2013.01); *B01D 53/002* (2013.01); *B01D 53/1425* (2013.01);
(Continued)

(58) Field of Classification Search
CPC ...... C01B 2203/0475; C01B 2203/047; C01B 2203/046; C01B 2203/0415; C01B 3/506;
(Continued)

(56) References Cited

U.S. PATENT DOCUMENTS

| 4,623,370 A | 11/1986 | Allen et al. |
| 2011/0097260 A1 | 4/2011 | Vauk et al. |
| 2016/0312137 A1* | 10/2016 | Bohn ................. B01D 53/1468 |

FOREIGN PATENT DOCUMENTS

| DE | 10 2016 013753 | 5/2018 |
| EP | 2 592 047 | 5/2013 |

OTHER PUBLICATIONS

Search Report and Written Opinion for EP 20151738, dated Jul. 13, 2020.

* cited by examiner

*Primary Examiner* — Anita Nassiri-Motlagh
(74) *Attorney, Agent, or Firm* — Justin K. Murray

(57) ABSTRACT

In a process for separating a mixture containing carbon monoxide, hydrogen and carbon dioxide, the mixture cooled in a heat exchanger is contacted by a stream of liquid methanol at a temperature below −40° C. to produce carbon dioxide enriched methanol and a carbon dioxide depleted gas relative to the cooled mixture, the carbon dioxide depleted gas is cooled in the heat exchanger and is sent to a separation unit to produce a carbon monoxide enriched stream and a hydrogen enriched stream and the streams enriched in carbon monoxide and hydrogen are heated in the heat exchanger by exchanging heat with the mixture.

8 Claims, 2 Drawing Sheets

(51) Int. Cl.
  *B01D 53/14* (2006.01)
  *B01D 53/18* (2006.01)
  *C01B 3/50* (2006.01)
  *F25J 3/02* (2006.01)
(52) U.S. Cl.
  CPC ..... *B01D 53/1475* (2013.01); *B01D 53/1493* (2013.01); *B01D 53/18* (2013.01); *C01B 3/506* (2013.01); *F25J 3/0223* (2013.01); *B01D 2252/2021* (2013.01); *C01B 2203/0415* (2013.01); *C01B 2203/046* (2013.01); *C01B 2203/047* (2013.01); *C01B 2203/0475* (2013.01)
(58) Field of Classification Search
  CPC ............ B01D 2252/2021; B01D 53/18; B01D 53/1493; B01D 53/1475; B01D 53/1425; B01D 53/002; F25J 3/0223
  USPC ...................................................... 423/648.1
  See application file for complete search history.

METHOD AND APPARATUS FOR SEPARATING A SYNTHESIS GAS BY CRYOGENIC DISTILLATION

CROSS REFERENCE TO RELATED APPLICATIONS

This application claims the benefit of priority under 35 U.S.C. § 119 (a) and (b) to European patent application No. EP20151738, filed Jan. 14, 2020, the entire contents of which are incorporated herein by reference.

FIELD OF THE INVENTION

The present invention relates to a method and an apparatus for separating a synthesis gas by cryogenic distillation.

BACKGROUND OF THE INVENTION

A synthesis gas produced by gasification contains carbon monoxide, hydrogen, carbon dioxide and other impurities, such as COS, $H_2S$, mercaptans, hydrocarbons etc. These impurities, including carbon dioxide, can be removed by a low-temperature methanol wash known as Rectisol®. This wash removes most impurities, but there may remain traces, for example a few ppm of $CO_2$.

The Rectisol® process is described in principle in Ullmann's Encyclopedia of Industrial Chemistry, 6th Ed. Vol. 15, p 399 et seq. The raw synthesis gas is cooled to sub-ambient temperature (10° C. to −30° C.) before it enters in the absorber column where it is contacted with a descending cold lean solvent in countercurrent pathway so that acid gases such as carbon dioxide and other impurities are removed from the synthesis gas. The cold treated synthesis gas leaves the absorber column at the top and is heated up by exchanging heat with the warm raw synthesis gas entering the Rectisol® process. The absorber column is typically operated in a temperature range from −50° C. (at the top) to −20° C. at the bottom of the column.

The $CO_2$ rich-solvent leaving the absorber column at the bottom is typically sent to a multi-stage regeneration section consisting of one or more flash regeneration steps in which part of the absorbed $CO_2$ is flashed out by reducing the operating pressure within the different flash stages. Finally the absorbent solvent from the last flash stage, semi-rich in $CO_2$, is heated up before entering the thermal regeneration section of the process in which all $CO_2$ and other absorbed gases are completely removed from the liquid solvent. The hot lean solvent, leaving the thermal regeneration stage is recirculated via at least one pump and a series of heat exchangers back to the absorber column. The hot lean solvent, leaving the thermal regeneration with a temperature of about 120° C. is cooled in a countercurrent way by cold semi-rich solvent coming from the flash stages and by external cooling media such as a liquid refrigerant in a series of heat exchangers to a temperature of about −50° C. before it enters the top of the absorber column.

Downstream of the Rectisol® process absorber column, the treated synthesis gas is generally sent to a cryogenic separation unit to separate hydrogen and carbon monoxide and to remove, if necessary, other impurities such as nitrogen, or argon. These separation units operate at very low temperatures, for example of the order of or below −170° C., or even of the order of or below −180° C. At these temperatures, remaining impurities such as $CO_2$ or methanol traces can freeze in the brazed aluminium plate heat exchangers used to cool the purified synthesis gas and clog them. This phenomenon leads to equipment breakdowns, which obviously have to be avoided.

To avoid solidification of the impurities in the exchangers, the impurities are removed by an adsorption purification unit, using activated alumina and a molecular sieve. The unit is placed between the Rectisol® absorber column and the low temperature distillation unit.

These purification units have a complex mode of operation and the process used is discontinuous. One aim of the present invention is to eliminate them or at least reduce their size.

SUMMARY OF THE INVENTION

Certain embodiments of the present invention aim to remove impurities that can condense or freeze in the heat exchanger using only low temperature separation methods.

The Rectisol® absorber column is routinely operated at temperatures between −50° C. at the top of the absorber and −20° C. at the bottom of the absorber. The colder the temperature at the top of the absorber, the lower is the concentration of $CO_2$ and other impurities within the treated synthesis gas. However to operate the absorber column at lower temperatures would require additional equipment that would significantly increase the investment cost for the Rectisol® process.

The invention proposes to remove impurities in the synthesis gas by means of an additional methanol wash carried out at temperatures below −50° C. The use of such low temperatures would normally generate significant additional costs but here the cooling capacity of a cryogenic separation unit is used to cool the synthesis gas and the methanol to temperatures below −50° C.

This additional methanol wash can be carried out below −60° C. It is preferably carried out at a temperature which is nevertheless above −100° C.

This additional methanol wash can be carried out below −85° C. It is preferably carried out at a temperature which is nevertheless above −98° C. The washing can be carried out at a temperature equal to or lower than −90° C. The washing may be carried out at a temperature equal to or greater than −95° C.

According to one object of the invention, there is provided a process for separating a mixture containing carbon monoxide, hydrogen and carbon dioxide produced by washing with methanol in an acid gas removal unit in which:
  i. the mixture is cooled in a heat exchanger
  ii. at least a portion of the cooled mixture exits the heat exchanger at an intermediate temperature of the heat exchanger produced by washing with methanol in an acid gas removal unit
  iii. the at least part of the cooled mixture is contacted with a liquid methanol stream at a temperature below −40° C., preferably below −80° C. to produce methanol enriched with carbon dioxide and a gas depleted in carbon dioxide compared to the cooled mixture
  iv. the carbon dioxide depleted gas is cooled in the heat exchanger and sent to a separation unit comprising a methane wash unit and/or carbon monoxide wash unit and/or nitrogen wash unit and/or distillation unit and/or partial condensation unit to produce a carbon monoxide enriched flow richer in carbon monoxide than the carbon dioxide depleted gas and a hydrogen enriched flow richer in hydrogen than the carbon dioxide depleted gas and
  v. the carbon monoxide enriched stream and/or the hydrogen-enriched stream is heated in the heat exchanger by exchanging heat with the mixture and/or the carbon dioxide depleted gas or is heated in another heat exchanger.

According to other optional aspects:

the process comprises a step of washing with methanol in a washing unit upstream of step i) to produce the mixture, which still contains at least traces of carbon dioxide, to be cooled in the heat exchanger of step i).

the carbon dioxide depleted gas is cooled to at least −170° C. upstream of the separation unit.

at least a part of the cooled mixture is contacted by a liquid methanol stream in a washing column fed at the top by the methanol stream and at the bottom by the at least part of the cooled mixture.

the gas depleted of carbon dioxide is drawn off at the top of the column and the methanol enriched in carbon dioxide is withdrawn at the bottom of the column.

the liquid methanol stream is cooled in the heat exchanger upstream of the washing column by heat exchange with the carbon monoxide enriched stream and/or the hydrogen-enriched stream the methanol stream comes from a gas purification process, which preferably uses methanol as a solvent to remove the impurities from the gas, the methanol stream is withdrawn from different withdrawal points to correspond to the temperature profile of the heat exchanger of step i).

the liquid methanol stream is cooled in the heat exchanger upstream of the washing the bottom liquid of the washing column is heated in the heat exchanger and then returned to the washing unit which produces the mixture to be cooled in the heat exchanger of step i).

the mixture has not been purified by adsorption upstream of the heat exchanger.

According to another aspect of the invention, there is provided an apparatus for separating a mixture containing carbon monoxide, hydrogen and carbon dioxide produced by washing with methanol in an acid gas removal unit, the apparatus comprising: a heat exchanger, and a separation unit which comprises a methane scrubbing column and/or a carbon monoxide scrubbing column and/or a nitrogen scrubbing column and/or a distillation column and/or at least one phase separator, means for sending the mixture to cool in the heat exchanger, means for removing at least a portion of the cooled mixture of the heat exchanger at an intermediate point of the heat exchanger, contact means optionally a washing column for promoting contact between the at least part of the cooled mixture and a liquid methanol stream at a temperature below −40° C., preferably below −45° C., means for withdrawing a gas less rich in carbon dioxide than the cooled mixture from the contact means, means for returning the withdrawn gas to cool in the heat exchanger, means for sending the cooled gas from the heat exchanger to the separation unit to produce a stream enriched in carbon monoxide with respect to the withdrawn gas and a stream enriched in hydrogen with respect to the withdrawn gas and means for sending the carbon monoxide enriched stream and/or the hydrogen enriched flow stream to warm in a heat exchanger or in the heat exchanger by exchanging heat with the mixture and/or the withdrawn gas.

Preferably the contacting means is a washing column fed at the top by a stream of liquid methanol at a temperature below −45° C., preferably below −50° C. or even below −60° C.

The washing column can be connected to two intermediate points of the heat exchanger both situated between a cold end and a warm end of the heat exchanger to receive respectively the mixture and the liquid methanol from these two intermediate points.

The apparatus may comprise an adsorption unit for purifying the gas withdrawn from the washing column to remove carbon dioxide and/or methanol upstream of the separation unit.

The apparatus may include a methanol washing unit upstream of the heat exchanger comprising a methanol absorption column, means for sending liquid methanol to the methanol absorption unit, means for removing the mixture from the methanol absorption column, means for removing a methanol stream containing carbon dioxide from the methanol absorption column, at least one regeneration unit for regenerating the methanol stream containing carbon dioxide and optionally a methanol storage tank.

The apparatus may include means for providing a liquid methanol stream connected to the means for sending liquid methanol to the methanol absorption column or to the methanol storage tank, if present The apparatus may include means for removing a liquid methanol stream enriched in carbon dioxide from the contact means, said means being connected to the means for sending liquid methanol to the methanol absorption column or to the means for removing a methanol stream containing carbon dioxide from the methanol absorption column or to the methanol storage tank, if present.

The apparatus may include an insulated conduit for transferring methanol between the contact means and the methanol washing unit, in at least one direction.

BRIEF DESCRIPTION OF THE DRAWINGS

Further features and advantages of the invention will become apparent from the description hereinafter of embodiments, which are given by way of illustration but without any limitation, the description being given in relation with the following attached figures.

DETAILED DESCRIPTION OF THE INVENTION

Figure 1:
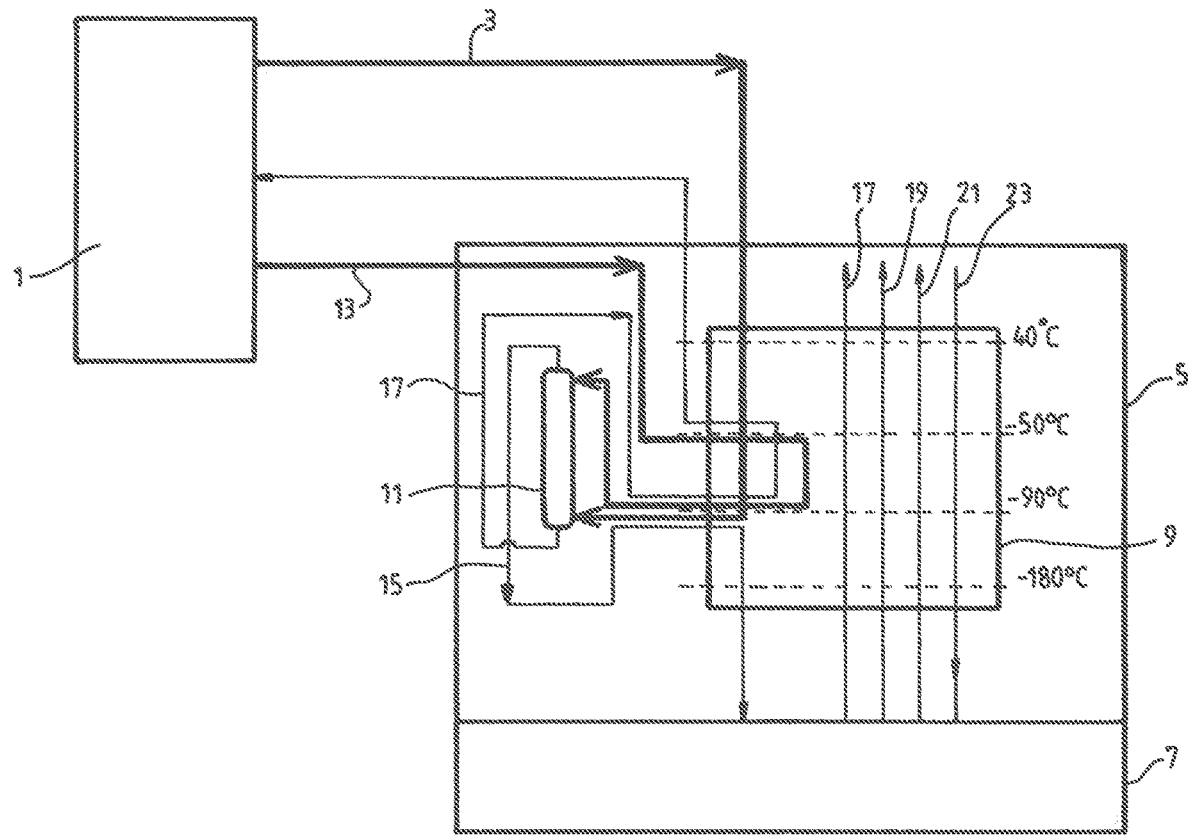
FIG. 1 describes the principles of an acid gas removal process (unit 1) integrated with a process according to an embodiment of the invention FIG. 2 describes the unit 1 in greater detail, including the options for the methanol withdrawal and return points for the cold methanol wash

In FIG. 1, an acid gas removal plant 1 including a methanol washing unit is used to wash a synthesis gas stream from, for example, a gasification. The synthesis gas contains carbon monoxide, hydrogen and carbon dioxide. Most of the carbon dioxide is removed by absorption in the methanol washing unit to produce synthesis gas containing carbon monoxide, hydrogen and some remaining carbon dioxide.

This synthesis gas typically leaves the acid gas removal process 1 and is sent to a heat exchanger which is a brazed aluminium plate and fin heat exchanger.

The synthesis gas sent to the heat exchanger can come from a source other than the unit 1.

The synthesis gas 3 is cooled, without having been purified by adsorption, to at least −50° C., preferably to at least −80° C., or even at least −95° C. using other streams stream 17,18,19,21 in the heat exchanger 9 that are thereby warmed. At least a portion of the synthesis gas leaves the heat exchanger 9 at this intermediate temperature and is sent to a methanol washing column 11 preferably disposed in the same insulated enclosure as the exchanger 9 and/or a separation unit 7. The overhead gas 15 of column 11 contains less carbon dioxide than the synthesis gas 3 entering the exchanger 9, is returned to the heat exchanger 9 and cooled to a temperature of at least −170° C. It preferably contains less than 0.01 ppm of carbon dioxide.

Then the synthesis gas 3 purified of carbon dioxide is sent to a cryogenic separation unit 7. This unit may contain one or more columns, combined (s) or not with at least one phase separator. The separation unit 7 may include means for methane washing and/or carbon monoxide washing and/or nitrogen washing and/or distillation and/or partial condensation. All of these means are operating at cryogenic temperatures and consequently exchanger 9 and/or column 11 and/or unit 7 may be contained within a single cold box 5.

The separation unit 7 may for example comprise a phase separator, a stripping column and a distillation column.

Unit 7 produces a fluid enriched in carbon monoxide compared to the carbon dioxide purified synthesis gas and/or a fluid 19 enriched in hydrogen with respect to the same gas. It can also produce a H2/CO mixture at a selected stoichiometry, for example to produce oxogas, i.e. a 50/50 H2/CO mixture. One or both of these fluids heats up in the heat exchanger 9 to provide cold for cooling the synthesis gas. The unit can also produce other fluids 21 such as nitrogen, a mixture of hydrogen and carbon monoxide, a waste gas, methane.

In addition, a fluid 23 may cool in the heat exchanger, for example a nitrogen stream, possibly to be condensed to provide refrigeration or else a carbon monoxide stream.

After washing in column 11, the overhead gas, from which carbon dioxide has been removed, is returned to an intermediate point of heat exchanger 9, for example at between −50° C. and −97° C.

Generally the gas 15 is returned to the heat exchanger 9 at the temperature at which the mixture exits the exchanger to feed the column 11. Then the overhead gas 15 is cooled to at least −170° C. in the heat exchanger 9 to feed the cryogenic separation unit 7.

An adsorption unit can be added to the washing column for purifying the gas withdrawn from the carbon dioxide and/or methanol washing column upstream of the separation unit 7. This adsorption can take place upstream the point of entry of the gas into the heat exchanger 9 or downstream of the heat exchanger 9 or at an intermediate point of the heat exchanger. Thus the last traces of carbon dioxide and/or methanol can be removed.

Similarly it is possible to provide an adsorption unit for purifying the synthesis gas 3 to remove a portion of carbon dioxide that it contains.

Methanol 13 can be processed in a mercury removal unit before it is sent to the brazed aluminium heat exchanger.

The washing column 11 can be replaced by a separator pot, not containing mass and/or heat exchange means or indeed by any means for contacting a liquid and a gas, for example a pipe.

The bottom liquid 17 of the washing column 11 can be reheated in the exchanger 9 from a temperature between about −80 and −95° C. It may be heated to any temperature which is not higher than the temperature of the appropriate return point. For example methanol enriched with carbon dioxide 17 can be heated in the heat exchanger 9 from about −85° to −95° C. and returned to the acid gas removal unit 1 at between −50° C. and ambient temperature.

Methanol enriched with carbon dioxide 17 is then returned to the unit 1, preferably, in the lean methanol path downstream of the withdrawal point.

The washing column 11 may be arranged upstream of a separator pot.

After washing in column 11, the stream from the top of the column can be sent to an adsorption unit to remove residual traces of carbon dioxide or methanol. The adsorbent may be a 13X, 5A zeolite, CaX, etc.

Methanol 13 may contain water.

The stream 3 and/or the methanol 12 can be cooled in a dedicated heat exchanger by heat exchange, separate from heat exchanger 9.

The methanol 13 can be cooled in one heat exchanger and heated up in another exchanger.

The methanol 13 and the gas 3 can be mixed and then cooled in a heat exchanger or in heat exchanger 9.

The methanol 13 for washing is cooled in the heat exchanger 9 to a temperature of at least −50° C., or even at least −80° C. This methanol is preferably from the acid gas removal process unit 1 and should have a $CO_2$ content as low as possible.

Methanol provided by the acid gas removal process unit for the washing column can be supplied at a temperature between −50° C. and ambient temperature.

Methanol provided by the acid gas removal process unit for the washing column could be provided at the temperature of the withdrawing point or heated up in a heat exchanger to around ambient temperature.

Methanol provided by the washing unit for the washing column is lean methanol, for example, methanol that has been freshly regenerated in the regeneration system of the washing unit.

Methanol provided by the washing unit for the washing column can be withdrawn downstream of any heat exchanger which is used to cool the lean solvent within the acid gas removal process. Some examples of withdrawal points are shown in FIG. 2.

Figure 2:
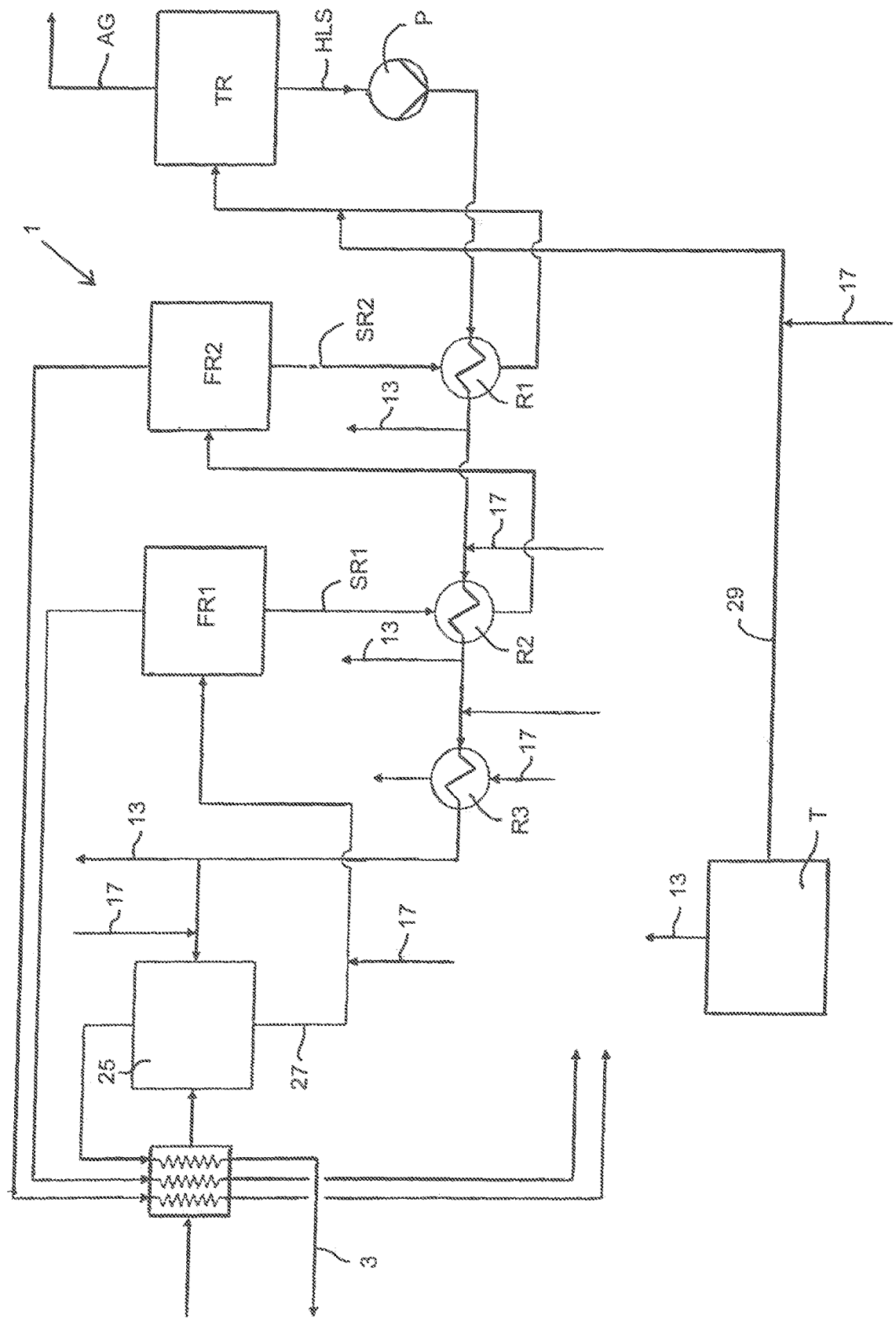

FIG. 2 shows raw synthesis gas which is sent to an absorption unit 25, which includes a methanol washing column, the methanol acting as a solvent to remove carbon dioxide and other acid gases present in the raw synthesis gas. The raw synthesis gas is cooled in a heat exchanger and then washed with methanol sent to the top of the column and to one or more intermediate points of the column. The treated synthesis gas 3, purified from carbon dioxide and other impurities, is then removed from the top of the column and warmed in the heat exchanger. It can then be sent for treatment in washing column 11 of FIG. 1 followed by separation in separation unit 7. The bottom liquid 27 of the column, which is methanol containing the removed carbon dioxide, is known as rich solvent and is regenerated in two successive flash regeneration steps (Flash Regeneration I FR1 and Flash Regeneration II FR2), producing respectively semi-rich solvent I SR1 and semi-rich solvent II SR2. The regeneration steps FR1, FR2 each produce a $CO_2$ vent gas which is warmed against the arriving raw synthesis gas in the heat exchanger. Semi-rich solvent SR1 is sent to heat exchanger R2 and then is sent to flash regenerator FR2. Finally the semi-rich solvent II SR2 from FR2 is purified in a thermal regeneration unit TR producing acid gas AG and hot lean solvent HLS which is cooled by at least one but typically by a series of heat exchangers R1, R2, R3 and is returned to the methanol washing column in unit 25 as the solvent via a solvent pump P.

To compensate for losses, methanol 29 is provided from a tank T which is sent to the thermal regeneration TR with semi-rich solvent II SR2.

The column 11 of FIG. 1 can be provided with methanol 13 taken from different points of the acid gas removal unit 1, four potential withdrawal points being shown in FIG. 2.

The methanol 13 from the acid gas removal process unit 1 is preferably lean solvent which is freshly regenerated in the regeneration system of the acid gas removal process unit 1. The figure shows the case where the methanol is taken from the thermal regeneration, at different positions corresponding to different temperatures of the lean solvent (Solvent Withdrawal Option 1 between coolers R1 and R2, Solvent Withdrawal Option 2 between coolers R2 and R3, Solvent Withdrawal Option 3 downstream of cooler R3). The optimum withdrawal point shall be selected such that the temperature of the lean solvent withdrawn from the acid gas removal process unit 1 fits best with the temperature profile of the heat exchanger 9

Lean solvent 13 for the washing column 11 can also be taken from the fresh solvent storage tank T included in the acid gas removal unit 1 (Solvent Withdrawal Option 4) at ambient temperature.

The selection of the return point depends on the temperature of the methanol returned to the unit 1. The operating temperature of the return point should have a temperature as close as possible to the operating temperature of the methanol returned.

In the case where the operating temperature of the methanol returned is higher than all the operating temperatures on the pathway downstream of the withdrawal point, the methanol stream 17 enriched with carbon dioxide shall be returned to the $CO_2$ rich solvent pathway upstream of the thermal regeneration section, preferably at the same location where fresh methanol solvent from the methanol storage tank is added to the solvent circulation line.

FIG. 2 shows five alternative return points for stream 17 in unit 1. Three points (Solvent Return Option 1, Solvent Return Option 2, Solvent Return Option 3) return the methanol 17 to the lean solvent coming from the last regeneration stage TR at different temperatures below 0° C. Solvent Return Option 4a returns the methanol 17 to the rich solvent 27 removed from the absorption column before any regeneration step.

Solvent Return Option 4b returns the solvent 17 to the liquid 29 from the Fresh Solvent Tank T at ambient temperature upstream of the thermal regeneration TR and of the mixing with stream SR2.

It will be understood that the methanol need only be removed from one point and be sent back to one point.

It is possible to warm the methanol 13,17 up to ambient temperature from a cryogenic temperature and then cool it to the temperature of the unit to which it is sent. Alternatively, the methanol can be sent from unit 1 to unit including methanol washing column 11 without warming it to an ambient temperature. In this case, it would be necessary to insulate the conduit for the transfer of methanol 13,17.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

What is claimed is:

1. A process for separating a mixture containing carbon monoxide, hydrogen and carbon dioxide produced by washing with methanol in an acid gas removal unit, the process comprising the steps of:
    i. cooling the mixture in a heat exchanger;
    ii. withdrawing at least a portion of the cooled mixture from the heat exchanger at an intermediate temperature of the heat exchanger between a cold end and a warm end of the heat exchanger;
    iii. contacting the at least part of the cooled mixture by a flow of liquid methanol at a temperature below −40° C. to produce methanol enriched with carbon dioxide and a carbon dioxide depleted gas with respect to the cooled mixture;
    iv. cooling the carbon dioxide depleted gas in the heat exchanger and sending the carbon dioxide depleted gas to a separation unit to produce a carbon monoxide enriched flow with respect to the carbon dioxide depleted gas and a hydrogen enriched flow with respect to the carbon dioxide depleted gas, wherein the separation unit is selected from the group consisting of methane washing, carbon monoxide washing, nitrogen washing, distillation, partial condensation, and combinations thereof, and
    v. heating a stream in the heat exchanger by exchanging heat with the mixture and/or the carbon dioxide depleted gas or heating the stream in another heat exchanger, wherein the stream is selected from the group consisting of the carbon monoxide enriched stream with respect to the carbon dioxide depleted gas, the hydrogen-enriched stream with respect to the carbon dioxide depleted gas, and combinations thereof.

2. The process of claim 1, wherein the carbon dioxide depleted gas is cooled to at least −170° C. upstream of the separation unit.

3. The process of claim 1 further comprising a step of washing with methanol in an acid gas removal unit upstream of step i) to produce the mixture to be cooled in the heat exchanger of the step i).

4. The process of claim 3, wherein the flow of methanol is from the acid gas removal unit which produces the mixture to be cooled in the heat exchanger of step i).

5. The process of claim 3, wherein at least a portion of the cooled mixture is contacted by a flow of liquid methanol in a washing column fed at the top by the stream of methanol and at the bottom by at least a portion of the cooled mixture, the carbon dioxide depleted gas being withdrawn at the top of the column and the carbon dioxide enriched methanol being withdrawn in the bottom of the column.

6. The process of claim 5, wherein a liquid from the washing column is returned to the acid gas removal unit which produces the mixture to be cooled in the heat exchanger of step i).

7. The process of claim 6, wherein the liquid is heated in the heat exchanger.

8. The process of claim 1, wherein the mixture has not been purified by adsorption upstream of the heat exchanger.

\* \* \* \* \*